United States Patent [19]

Bergerson et al.

[11] Patent Number: 5,660,413
[45] Date of Patent: Aug. 26, 1997

[54] AIR BAG INFLATOR WITH LASER DIODE INITIATOR

[75] Inventors: Lee D. Bergerson, Fountain Valley; Ivan L. Stonich, Hermosa Beach, both of Calif.

[73] Assignee: TRW Vehicle Safety Systems Inc., Lyndhurst, Ohio

[21] Appl. No.: 518,782

[22] Filed: Aug. 24, 1995

[51] Int. Cl.⁶ .................................................. B60R 21/26
[52] U.S. Cl. ........................................... 280/741; 102/201
[58] Field of Search ............................... 280/741, 736, 280/737; 137/68.13, 68.19, 68.23; 222/3; 102/201, 530, 531, 202.12, 202.14, 202.9, 202.5

[56] References Cited

U.S. PATENT DOCUMENTS

| | | | |
|---|---|---|---|
| 3,135,200 | 6/1964 | Jackson | 102/202.9 |
| 3,528,372 | 9/1970 | Lewis et al. | 102/201 |
| 3,901,530 | 8/1975 | Radke | 280/741 |
| 4,817,828 | 4/1989 | Goetz | 280/736 |
| 4,870,903 | 10/1989 | Carel et al. | 102/201 |
| 4,930,418 | 6/1990 | Folsom | 102/201 |
| 5,010,822 | 4/1991 | Folsom | 102/201 |
| 5,099,761 | 3/1992 | Betts et al. | 102/201 |
| 5,204,490 | 4/1993 | Stoltz et al. | 102/201 |
| 5,290,060 | 3/1994 | Smith | 137/68.13 |
| 5,348,344 | 9/1994 | Blumenthal et al. | 280/737 |
| 5,406,889 | 4/1995 | Letendre et al. | 102/201 |
| 5,460,407 | 10/1995 | Stuckle | 280/741 |

FOREIGN PATENT DOCUMENTS

| | | | |
|---|---|---|---|
| 43 13 571 | 8/1994 | Germany . | |
| 2270742 | 3/1994 | United Kingdom | 280/736 |

OTHER PUBLICATIONS

Co-pending U.S. Patent Application Serial No. 08/518,825, filed Aug. 24, 1995, entitled "Inflator for An Inflatable Vehicle Occupant Restraint".

Primary Examiner—Brian L. Johnson
Assistant Examiner—Peter C. English
Attorney, Agent, or Firm—Tarolli, Sundheim, Covell, Tummino & Szabo

[57] ABSTRACT

An air bag inflator (22) includes a source (40) of inflation fluid for inflating the air bag (20), and includes an initiator (30) which, when actuated, initiates a flow of the inflation fluid from the source (40) to the air bag (20) to inflate the air bag (20). The initiator (30) includes pyrotechnic material (100) and a laser diode (106). The laser diode (106) emits laser light which ignites the pyrotechnic material (100) when the initiator (30) is actuated.

3 Claims, 3 Drawing Sheets

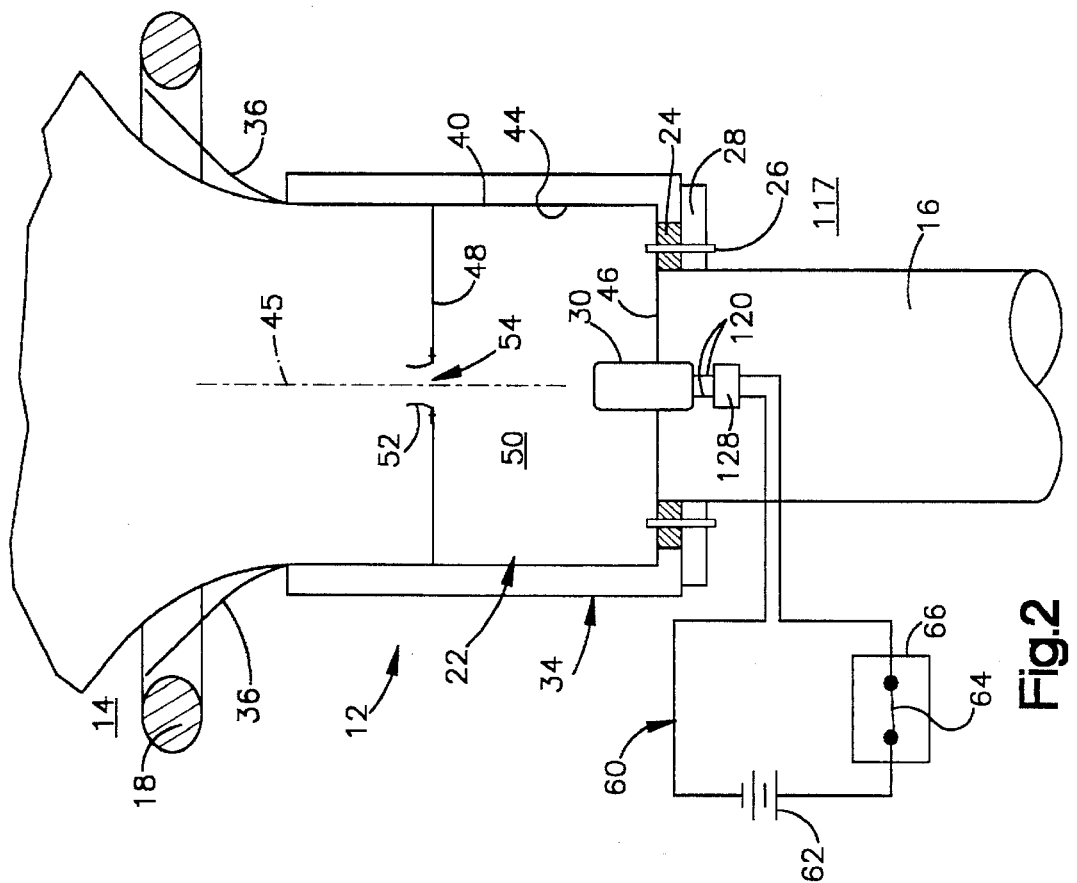
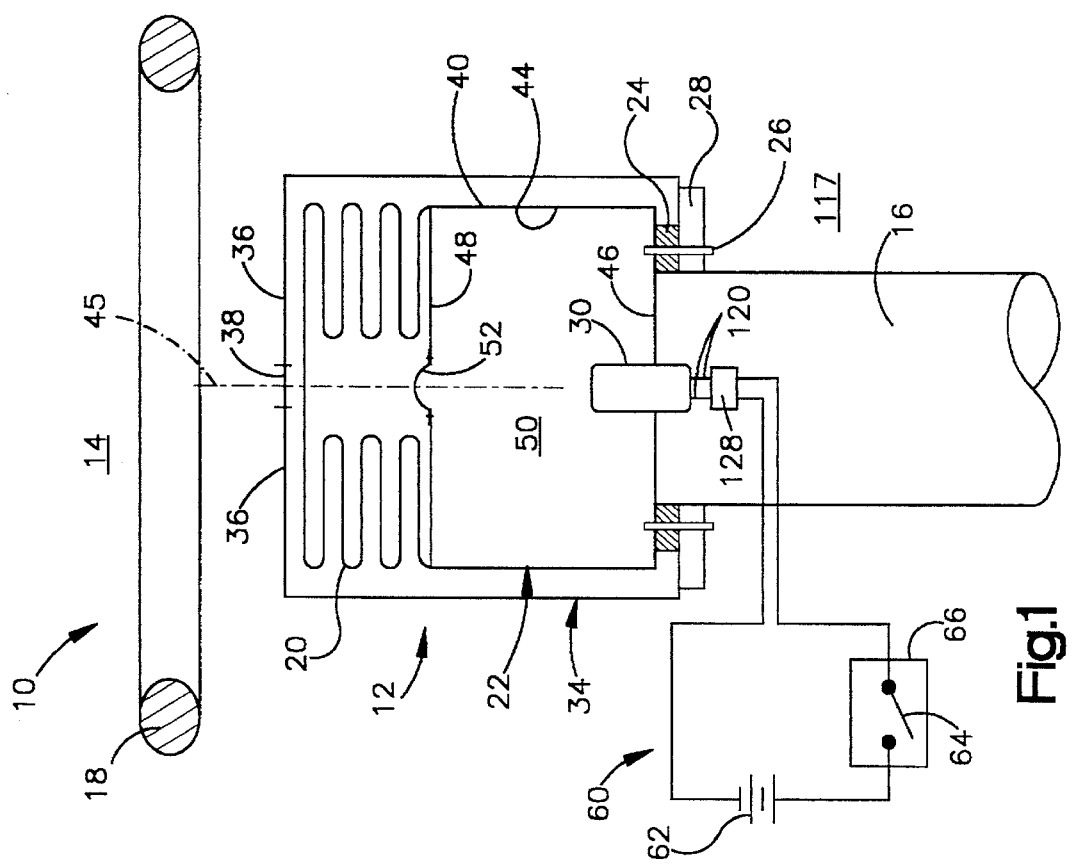

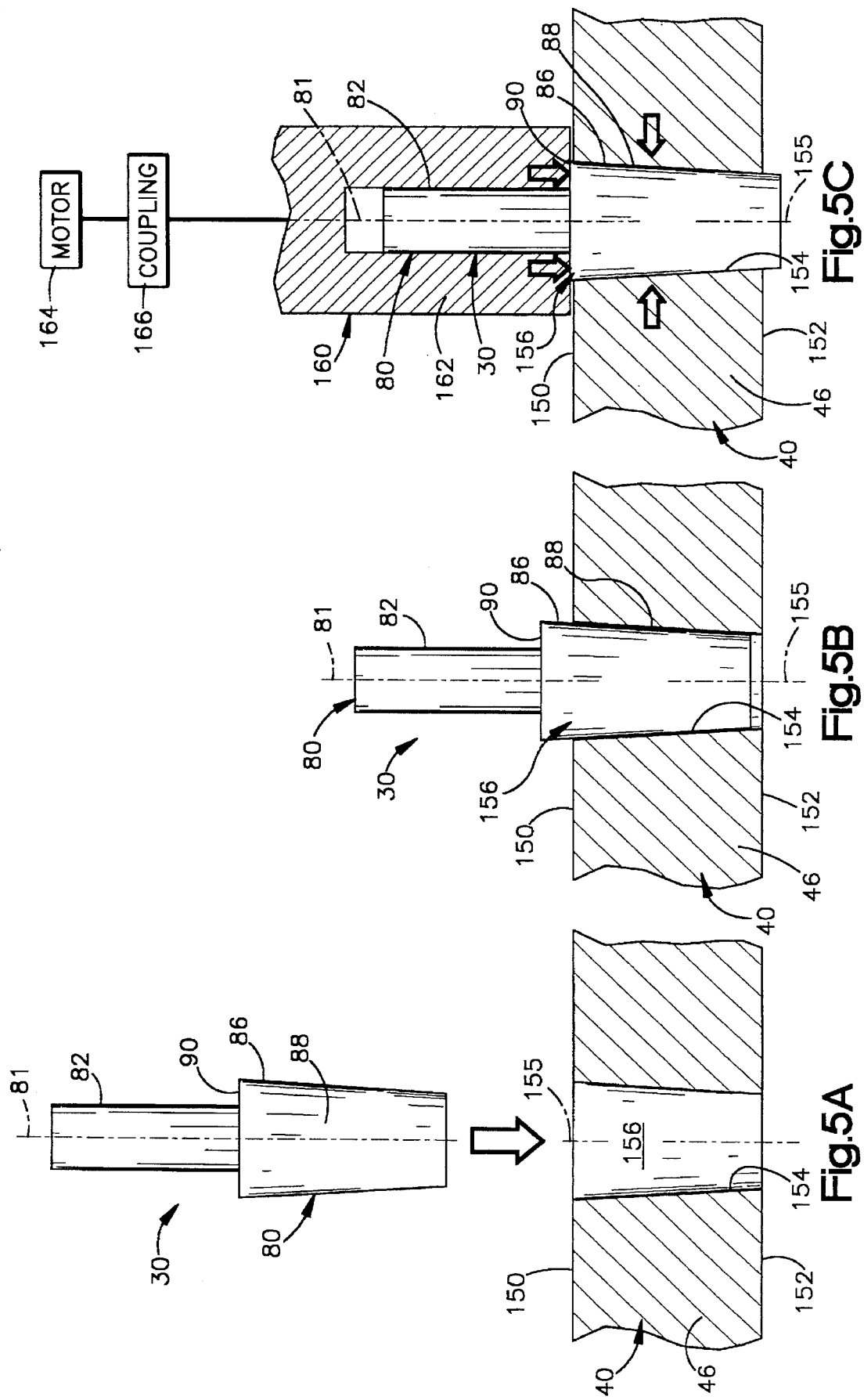

AIR BAG INFLATOR WITH LASER DIODE INITIATOR

FIELD OF THE INVENTION

The present invention relates to an inflatable vehicle occupant restraint, and particularly relates to an inflator comprising a source of inflation fluid for inflating the restraint.

BACKGROUND OF THE INVENTION

A vehicle occupant restraint apparatus which includes an inflatable vehicle occupant restraint, such as an air bag, further includes an inflator. When the inflator is actuated, it rapidly emits a large volume of inflation fluid which is directed into the restraint to inflate the restraint. The restraint then restrains an occupant of the vehicle from forcefully striking parts of the vehicle as a result of the collision.

Such an inflator may have a combustion chamber containing an ignitable gas generating material. When the inflator is actuated, the gas generating material is ignited and rapidly generates a large volume of gas for inflating the restraint. The inflator may alternatively comprise a pressure vessel containing a stored quantity of inflation fluid under pressure. The inflation fluid is released to flow from the pressure vessel to the restraint when the inflator is actuated. Inflators are also known to have combinations of pressurized inflation fluid and ignitable material. In each case, the inflator has an electrically actuatable initiator which initiates a flow of inflation fluid from the inflator upon the occurrence of a vehicle collision.

The initiator typically comprises a squib containing pyrotechnic material. The squib is connected with a sensor that senses vehicle conditions indicative of a vehicle collision. If the sensor senses a collision-indicating condition of a predetermined threshold value, it directs electric current through the squib to actuate the squib. The pyrotechnic material in the squib is then ignited. As a result, the ignitable material is ignited and/or the pressurized inflation fluid is released from its container.

SUMMARY OF THE INVENTION

In accordance with the present invention, an apparatus for inflating an inflatable vehicle occupant restraint, such as an air bag, comprises a source of inflation fluid. The inflation fluid inflates the restraint when emitted from the source. The apparatus further includes initiator means which, when actuated, initiates a flow of the inflation fluid from the source. The initiator means includes pyrotechnic material and a laser diode. The laser diode emits laser light which ignites the pyrotechnic material when the initiator means is actuated.

In a preferred embodiment of the present invention, the initiator means includes a tubular metal casing with a longitudinal central axis. The pyrotechnic material and the laser diode are contained in the casing at locations spaced from each other along the axis. When the initiator means is actuated, the laser diode projects the laser light along the axis from the laser diode to the pyrotechnic material to ignite the pyrotechnic material.

In the preferred embodiment of the present invention, the source of inflation fluid comprises a pressure vessel containing inflation fluid under pressure. The inflation fluid contained in the pressure vessel comprises a combustible mixture of gases. When the pyrotechnic material is ignited, it produces combustion products which ignite the combustible mixture of gases. This causes the temperature and pressure of the inflation fluid in the pressure vessel to increase rapidly. The inflation fluid is then directed from the pressure vessel to the air bag at a high flow rate which results from the increased pressure level attained by the inflation fluid in the pressure vessel.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant restraint apparatus comprising a preferred embodiment of the present invention;

FIG. 2 is a view showing the apparatus of FIG. 1 in an actuated condition;

FIGS. 5A, 5B, and 5C are schematic views indicating a sequence of steps taken in assembly of the apparatus of FIG. 1.

DESCRIPTION OF A PREFERRED EMBODIMENT

Figure 3:
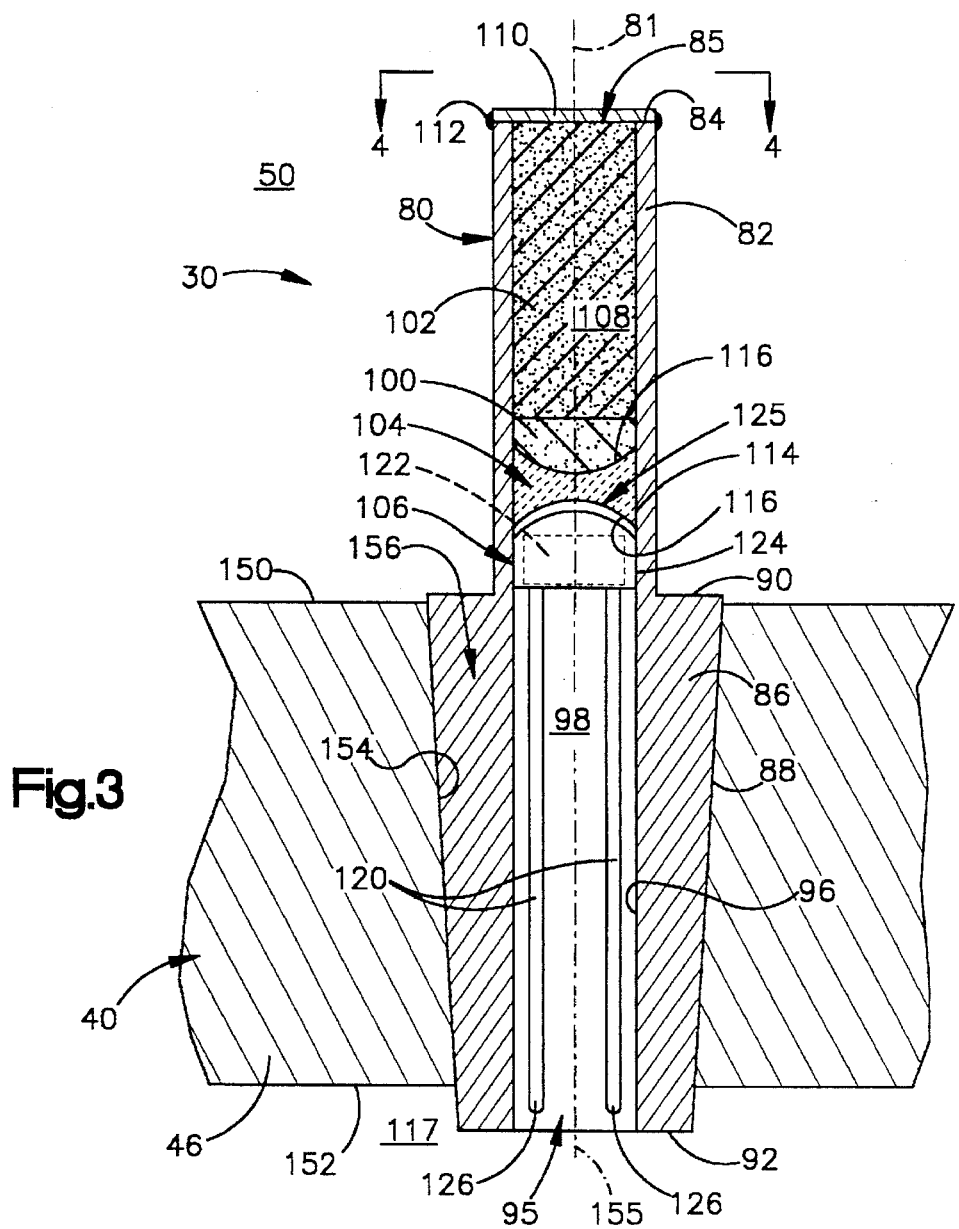
FIG. 3 is an enlarged partial view of the apparatus of FIG. 1.

As shown schematically in FIGS. 1 and 2, a vehicle occupant restraint apparatus 10 comprising a preferred embodiment of the present invention includes an air bag module 12. The air bag module 12 is mounted in a vehicle at a location adjacent to the vehicle occupant compartment 14, such as on the steering column 16 near the center of the steering wheel 18. The air bag module 12 includes a particular type of inflatable vehicle occupant restraint 20 which is commonly referred to as an air bag. The air bag module 12 also includes an inflator 22 which comprises a source of inflation fluid for inflating the air bag 20. Any suitable mounting structure known in the art, such as a retainer ring 24 with fasteners 26, can be used for mounting the air bag module 12 on a corresponding mounting portion 28 of the steering column 16.

The inflator 20 may contain an ignitable gas generating material for generating a large volume of gas. The inflator 20 may alternatively contain a stored quantity of pressurized inflation fluid, or a combination of pressurized inflation fluid and ignitable material for heating the inflation fluid. In any case, the inflator 20 has an electrically actuatable initiator 30 which, when actuated, initiates a flow of inflation fluid from the inflator 20.

When the initiator 30 is actuated, the resulting flow of inflation fluid rapidly inflates the air bag 20 from a folded, uninflated condition, as shown in FIG. 1, to an unfolded, inflated condition, as shown partially in FIG. 2. When the air bag 20 is being inflated, it moves into the vehicle occupant compartment 14 between the steering column 16 and the driver of the vehicle. The air bag 20 then restrains movement of the driver toward the steering column 16 to help protect the driver from a forceful impact with the steering column 16 or other parts of the vehicle.

A deployment assembly 34 encloses the air bag 20 and the inflator 22 on the steering column 16. The deployment assembly 34 is a known structure which includes a pair of deployment door panels 36. The deployment door panels 36 are held in closed positions, as shown in FIG. 1, by a rupturable seam 38. When the inflation fluid emitted from the inflator 22 begins to inflate the air bag 20, it moves the air bag 20 forcefully outward against the deployment assembly 34. The air bag 20 then ruptures the seam 38 and moves the deployment door panels 36 pivotally outward, as shown in FIG. 2. As the inflation fluid continues to inflate the air bag 20, it moves the air bag 20 outward past the deployment door panels 36 and into the vehicle occupant compartment 14.

The inflator 22 in the preferred embodiment of the present invention is a pressure vessel which comprises a container 40. The container 40 has a cylindrical charge wall 44 with a longitudinal central axis 45. The container 40 further has inner and outer end walls 46 and 48 centered on the axis 45. The walls 44, 46, and 48 of the container 40 together define a cylindrical storage chamber 50 which contains pressurized inflation fluid for inflating the air bag 20. A closure portion 52 of the outer end wall 48 is rupturable in a controlled manner, as shown schematically in FIG. 2, so as to provide an outlet opening 54 through which the inflation fluid can exit the storage chamber 50. As thus far described, the walls 44, 46, and 48 of the container 40, including the closure portion 52 of the outer end wall 48, may have any suitable structure known in the art.

The inflation fluid contained in the storage chamber 50 preferably comprises a combustible mixture of gases in accordance with the invention set forth in U.S. Pat. No. 5,348,344, to Blumenthal, et al., entitled APPARATUS FOR INFLATING A VEHICLE OCCUPANT RESTRAINT USING A MIXTURE OF GASES, and assigned to TRW Vehicle Safety Systems Inc. Accordingly, the inflation fluid comprises a combustible mixture of gases in an unignited, homogeneous gaseous state. The combustible mixture of gases includes a primary gas and a combustible gas. The primary gas comprises the majority of the gas that inflates the air bag 20. The combustible gas, when ignited, heats the primary gas.

The primary gas preferably includes an inert gas for inflating the air bag 20 and an oxidizer gas for supporting combustion of the combustible gas. The primary gas may include air, an inert gas, or a mixture of air and an inert gas. The inert gas may be nitrogen, argon or a mixture of nitrogen and argon. For example, the primary gas may be air, with the oxidizer gas being the oxygen in the air. The combustible gas may be hydrogen, methane, or a mixture of hydrogen and methane. Preferably, the combustible gas is hydrogen. A preferred composition of the mixture of gases is about 12% by volume hydrogen and about 88% by volume air. Although the storage pressure of the inflation fluid may vary, the combustible mixture of gases is preferably contained in the storage chamber 50 at a storage pressure within the range of approximately 1500 psi. to approximately 5000 psi., and is most preferably contained in the storage chamber 50 at a storage pressure of approximately 2500 psi.

As shown schematically in FIGS. 1 and 2, the initiator 30 extends partially into the storage chamber 50 through the inner end wall 46 of the container 40. The initiator 30 is included in an electrical circuit 60 which further includes a power source 62 and a normally open switch 64. The power source 62 is preferably the vehicle battery. The switch 64 is part of a sensor 66 which senses a condition indicating the occurrence of a vehicle collision. The collision-indicating condition may comprise, for example, sudden vehicle deceleration caused by a collision. If the collision-indicating condition is above a predetermined threshold level, it indicates the occurrence of a collision for which inflation of the air bag 20 is desired to restrain movement of the driver of the vehicle, as described above. The sensor 66 then closes the switch 64, and the initiator 30 is actuated electrically.

When the initiator 30 is actuated, it ignites the combustible mixture of gases in the storage chamber 50. This causes the temperature and pressure of the gases in the storage chamber 50 to increase rapidly to elevated levels. The gases then apply increasing fluid pressure forces outward against the surrounding walls 44, 46, and 48 of the container 40. This induces stress in the walls 44, 46, and 48 of the container 40. When the stress in the closure portion 52 of the outer end wall 48 reaches a predetermined elevated level, the closure portion 52 ruptures so as to provide the outlet opening 54 (FIG. 2). The container 40 is thus opened upon actuation of the initiator 30. The gases then exit the storage chamber 50 through the outlet opening 54 to inflate the air bag 20 at a high flow rate. The high flow rate results from the elevated pressure level attained by the mixture of gases upon combustion in the storage chamber 50.

As shown in greater detail in FIG. 3, the initiator 30 has an elongated tubular casing 80 which extends through the inner end wall 46 of the container 40 (FIG. 1). Although the casing 80 may be formed of any suitable material known in the art, it is preferably formed of steel, and is most preferably formed of a steel marketed under the trademark KOVAR by CRS Holdings, Inc., of Wilmington, Del.

The casing 80 has a circular cross sectional shape centered on a longitudinal axis 81. A cylindrical section 82 of the casing 80 extends axially along approximately one-half of the length of the casing 80. The cylindrical section 82 has an annular inner end surface 84 defining a circular opening 85 centered on the axis 81.

A tapered section 86 of the casing 80 extends axially from the cylindrical section 82 along the balance of the length of the casing 80. The tapered section 86 of the casing 80 has a frusto-conical shape defined by a frusto-conical peripheral surface 88. The tapered section 86 further has a pair of oppositely facing annular surfaces 90 and 92 at opposite ends of the tapered section 86. The first annular surface 90 of the tapered section 86 is a shoulder surface which lies in a plane perpendicular to the axis 81 and which faces inward along the cylindrical section 82. The second annular surface 92 of the tapered section 86 is an outer end surface located outside the container 40 and defining a circular opening 95 centered on the axis 81.

A cylindrical inner surface 96 of the casing 80 extends axially through both sections 82 and 86 from the inner end surface 84 to the outer end surface 92. The cylindrical inner surface 96 thus defines a cylindrical conduit 98 extending fully through the casing 80 between the circular openings 85 and 95.

The casing 80 contains parts of the initiator 30 which cooperate to ignite the combustible mixture of gases in the storage chamber 50 when the initiator 30 is actuated, as described briefly above. These include first and second charges 100 and 102 of pyrotechnic material, a transparent glass seal 104, and a laser diode 106.

The first charge 100 of pyrotechnic material is a primer charge. The second charge 102 of pyrotechnic material is a main charge, and is substantially larger than the first charge 100. Preferably, the first charge 100 is approximately 10–35 mg. of $ZrKClO_4$, and the second charge 102 is approximately 75–250 mg. of $BKNO_3$. The two charges 100 and 102 of pyrotechnic material fill an inner portion 108 of the conduit 98 which is located axially between the glass seal 104 and the opening 85.

A circular closure wall 110 abuts the annular inner end surface 84 of the casing 80, and is fixed to the casing 80 by a weld 112. The closure wall 110 and the weld 112 together close the opening 85 to retain the charges 100 and 102 of pyrotechnic material within the inner portion 108 of the conduit 98. The closure wall 110 and the weld 112 also define a hermetic seal for isolating the charges 100 and 102 of pyrotechnic material from the storage chamber 50, and for blocking leakage of the inflation fluid outward from the storage chamber 50 through the opening 85.

The glass seal 104 may be formed of any suitable transparent glass material known in the art, but is preferably formed of a boro-silicate glass, such as either of the boro-silicate glasses marketed by Dow Corning Corporation under the product numbers 7057 and 7070. In the preferred embodiment of the present invention shown in the drawings, the glass seal 104 is a disk-shaped part with a cylindrical outer surface 114 and a pair of concave opposite side surfaces 116.

The cylindrical outer surface 114 of the glass seal 104 has a diameter substantially equal to the diameter of the cylindrical inner surface 96 of the casing 80. The glass seal 104 is received closely within the conduit 98, with the cylindrical surfaces 114 and 96 being pressed radially against each other tightly enough to define a hermetic seal. The hermetic seal isolates the charges 100 and 102 of pyrotechnic material from the ambient atmosphere 117 at the outer end of the conduit 98. As shown in FIG. 3, the glass seal 104 is contained entirely within the cylindrical section 82 of the casing 80. However, the glass seal 104 could alternatively project into the tapered section 86 of the casing 80, or could be contained entirely within the tapered section 86.

The laser diode 106 includes a pair of electrodes 120, and further includes a semiconductor structure 122 (shown schematically). The semiconductor structure 122 generates laser light upon the passage of electric current through the semiconductor structure 122 between the electrodes 120. Such laser diodes are known in the art.

The laser diode 106 is contained in the conduit 98 adjacent to the glass seal 104. Specifically, the laser diode 106 is inserted through the opening 95 at the outer end of the casing 80, and is moved axially inward through the conduit 98 toward the glass seal 104. A cylindrical outer surface 124 of the laser diode 106 has a diameter that is equal to, or just slightly less than, the diameter of the cylindrical inner surface 96 of the casing 80. The laser diode 106 thus fits closely within the conduit 98 and is retained securely in the conduit 98 by the tight fit. A small gap 125 is provided between the laser diode 106 and the glass seal 104 to allow for thermal expansion and contraction of those parts throughout the life of the initiator 30.

The electrodes 120 on the laser diode 106 extend outward through the conduit 98 toward the opening 95 at the outer end of the casing 80. Each electrode 120 has an outer end portion 126 which is accessible through the opening 95 for engagement with an electrical connector 128 (FIG. 1). The electrodes 120 are thus accessible for connection of the initiator 30 in the electrical circuit 60. The electrical connector 128 may have any suitable structure known in the art. Accordingly, the outer end portions 126 of the electrodes 120 may be spaced a short distance inward from the opening 95, as shown in FIG. 3, or may alternatively project a short distance outward through the opening 95, depending upon the structure of the particular electrical connector to be used.

When the switch 64 in the electrical circuit 60 is closed, electric current is directed through the initiator 30 to actuate the initiator 30, as described above with reference to FIGS. 1 and 2. Electric current then flows through the laser diode 106 inside the casing 80. This causes the laser diode 106 to emit laser light which is projected axially inward through the conduit 98 from the laser diode 106 to the first charge 100 of pyrotechnic material. The first charge 100 of pyrotechnic material is then ignited by the energy of the laser light.

When the first charge 100 of pyrotechnic material in the casing 80 is ignited, it produces and emits combustion products which, in turn, ignite the second charge 102 of pyrotechnic material. The second charge 102 of pyrotechnic material then produces and emits additional combustion products inside the casing 80. The resulting brissance and gas pressure rupture the closure wall 110 and spew the combustion products outward from the casing 80 through the opening 85. The combustion products generated in the casing 80 are thus spewed into the storage chamber 50 to ignite the combustible mixture of gases in the storage chamber 50. This causes the combustible mixture of gases to open the container 40 for inflation of the air bag 20 in the manner described above.

Figure 4:
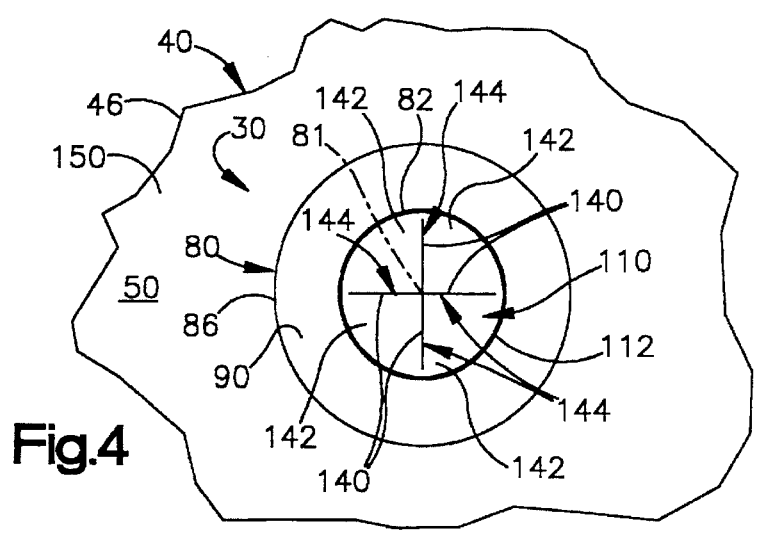
FIG. 4 is a view taken on line 4—4 of FIG. 3.

The closure wall 110 is rupturable, as compared with the surrounding inner section 82 of the casing 80, so that the combustion products produced in the casing 80 will not rupture the casing 80, but will instead rupture the closure wall 110 and emerge from the casing 80 through the opening 85. Preferably, this is accomplished by providing the closure wall 110 with a plurality of score lines 140 (FIG. 4). The score lines 140 delineate sections 142 of the closure wall 110 which have the shapes of generally triangular petals. The score lines 140 also weaken the closure wall 110 so as to define stress risers 144 which extend along the score lines 140 between the adjoining sides of the petal-shaped sections 142. The stress risers 144 are designed to rupture under the stress induced by the brissance and the elevated gas pressure produced inside the casing 80. When the stress risers 144 rupture, the petal-shaped sections 142 of the closure wall 110 separate from each other at their adjoining sides and deflect axially inward of the storage chamber 50. Although the closure wall 110 is shown in FIG. 4 to have four score lines 140 extending radially outward from its center, a different pattern of score lines could alternatively be used to define a different number and/or configuration of the petal-shaped sections 142.

Further in accordance with the present invention, the initiator 30 is engaged with the inner end wall 46 of the container 40 in a manner which provides a hermetic seal between those parts without the use of a weld or other separate sealing structure. The hermetic seal is provided by adjoining surfaces of the initiator 30 and the inner end wall 46 which are pressed tightly against each other.

Specifically, as shown in FIG. 3, the inner end wall 46 of the container 40 has a pair of oppositely facing inner and outer side surfaces 150 and 152. The inner side surface 150 faces inward of the storage chamber 50, and is normally subjected to the pressure of the inflation fluid contained in the storage chamber 50. The outer side surface 152 faces oppositely away from the inner side surface 150, and is normally subjected to the pressure of the ambient atmosphere 117. A frusto-conical surface 154 of the end wall 46 is centered on an axis 155, and extends axially through the end wall 46 fully between the inner and outer side surfaces 150 and 152.

The frusto-conical surface 154 of the end wall 46 is tapered so as to extend radially inward, and axially outward, from the inner side surface 150 to the outer side surface 152. A passage 156 defined by the frusto-conical surface 154 also extends fully through the end wall 46, and likewise has a tapered contour extending radially inward, and axially outward, from the inner side surface 150 to the outer side surface 152. Importantly, the frusto-conical peripheral surface 88 on the tapered section 86 of the casing 80 has a contour which closely matches the contour of the frusto-conical surface 154 on the end wall 46 of the container 40.

The tapered section 86 of the casing 80 is receivable in the passage 156 in the end wall 46 in the installed position in which it is shown in FIG. 3. The frusto-conical surface 88 on the casing 80 then adjoins the frusto-conical surface 154 on the end wall 46 fully throughout the length and circumference of the frusto-conical surface 154 on the end wall 46. The adjoining frusto-conical surfaces 88 and 154 are pressed against each other tightly enough to establish a seal which blocks a flow of gas that might otherwise leak outward from the storage chamber 50 through the passage 156 between the casing 80 and the end wall 46.

A method of installing the initiator 30 in the installed position of FIG. 3 is shown schematically by way of example in FIGS. 5A–5C. As indicated in FIGS. 5A and 5B, the casing 80 is first moved axially into the passage 156 in the end wall 46 until the frusto-conical surfaces 88 and 154 initially adjoin each other in relatively loose, mating contact as a result of their complementary tapered contours. As indicated in FIG. 5C, a suitable driving tool, such as a shaft 160 with a socket head 162, is then used to apply a driving force axially against the shoulder surface 90 on the tapered section 86 of the casing 80. The driving force is transmitted to the shaft 160 from a pneumatic or hydraulic motor 164 by a suitable coupling 166, as further shown schematically in FIG. 5C. This advances the tapered section 86 of the casing 80 a short distance axially outward through the passage 156 in the end wall 46. As a result, the adjoining frusto-conical surfaces 88 and 154 become pressed tightly against each other to establish a seal.

More specifically, the tapered section 88 of the casing 80 becomes radially compressed, and is maintained under radially compressive loading, as indicated by the horizontal arrows shown in FIG. 5C. Such compressive loading maintains the sealing effect provided by the adjoining frusto-conical surfaces 88 and 154. Additionally, the inflation fluid in the storage chamber 50 continuously applies fluid pressure forces axially outward against the casing 80 at the closure wall 110 and the shoulder surface 90. As a result of their complementary tapered contours, the adjoining frusto-conical surfaces 88 and 154 are continuously urged into tighter sealing contact with each other under the influence of such axially directed fluid pressure forces.

The laser diode 106 is preferably installed in the casing 80 after the casing 80 has been installed in the end wall 46. However, the glass seal 104 is installed in the casing 80 before the casing 80 is installed in the end wall 46, and is preferably contained entirely within the cylindrical section 82 of the casing 80, as noted above. Accordingly, the glass seal 104 is spaced axially from the radially compressed portion of the tapered section 86 which is located in the passage 156. This helps to protect the glass seal 104 from being broken by the compressive load applied to the casing 80 when the casing 80 is installed in the end wall 46 in the foregoing manner.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for inflating an inflatable vehicle occupant restraint, said apparatus comprising:

a source of inflation fluid for inflating the restraint; and initiator means which, when actuated, initiates a flow of said inflation fluid from said source to the restraint to inflate the restraint, said initiator means including a casing containing pyrotechnic material and a laser diode, said laser diode emitting laser light which ignites said pyrotechnic material when said initiator means is actuated;

said casing having an axis extending in a straight line from said laser diode to said pyrotechnic material, said laser diode projecting said laser light along said axis from said laser diode to said pyrotechnic material when said initiator means is actuated;

said source of inflation fluid comprises container means for defining a storage chamber containing inflation fluid under pressure, said container means including a container wall having a frusto-conical surface defining a passage extending outward from said storage chamber through said container wall, said casing extending into said storage chamber through said passage in said container wall and having a frusto-conical peripheral surface, said frusto-conical surfaces having a condition of being pressed tightly against each other in sealing contact so as to comprise sealing means for blocking said inflation fluid from exiting said storage chamber through said passage between said initiator means and said container wall.

2. Apparatus as defined in claim 1 wherein said casing defines a conduit extending along said axis, said conduit containing a glass part which comprises means for defining a hermetic seal for isolating said pyrotechnic material from ambient atmosphere, said sealing means applying a radially compressive sealing force to said casing, said glass part being spaced from said-sealing means along said axis.

3. Apparatus as defined in claim 2 wherein said casing has an outer portion located in said passage and has an inner portion projecting from said outer portion into said storage chamber, said sealing means applying said radially compressive sealing force directly to said outer portion of said casing, said glass part being contained in said inner portion of said casing.

* * * * *